H. D. ESTES & W. H. PARKS.
DEMOUNTABLE WHEEL RIM.
APPLICATION FILED MAY 25, 1917.
1,274,863.
Patented Aug. 6, 1918.
3 SHEETS—SHEET 1.
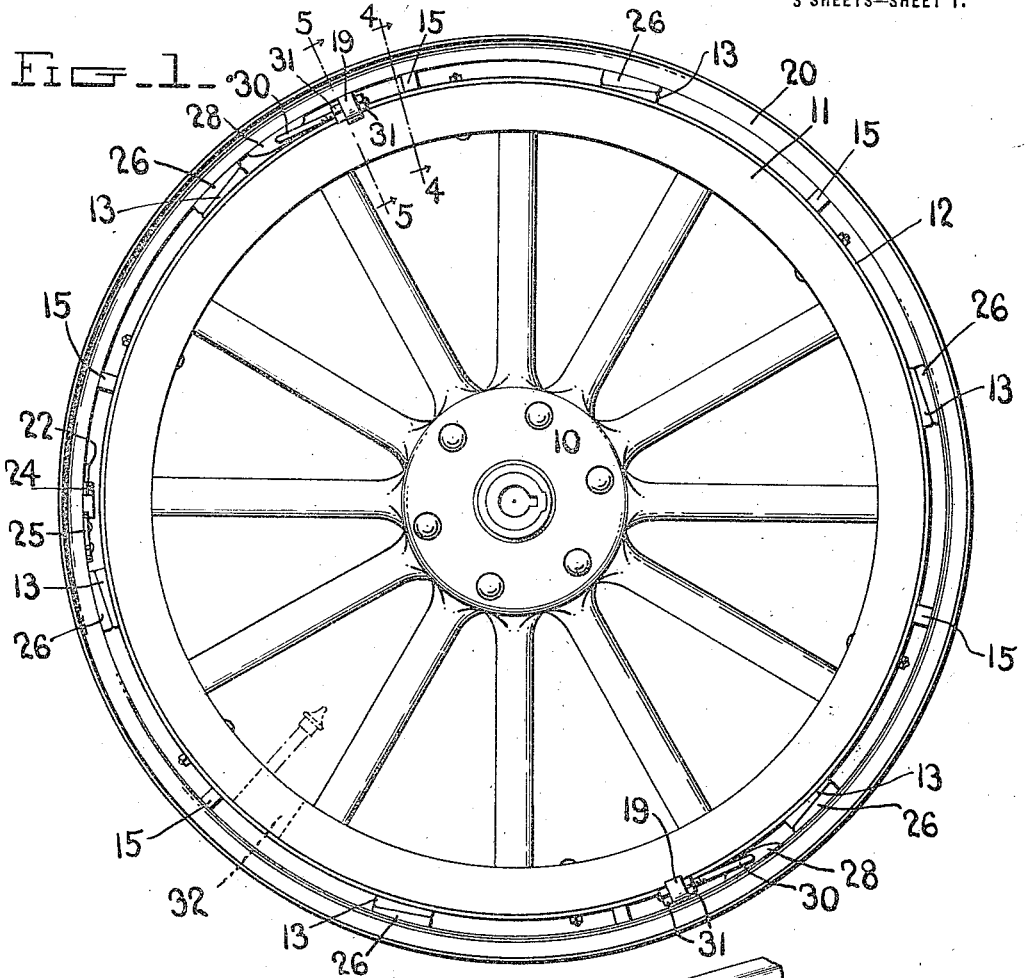
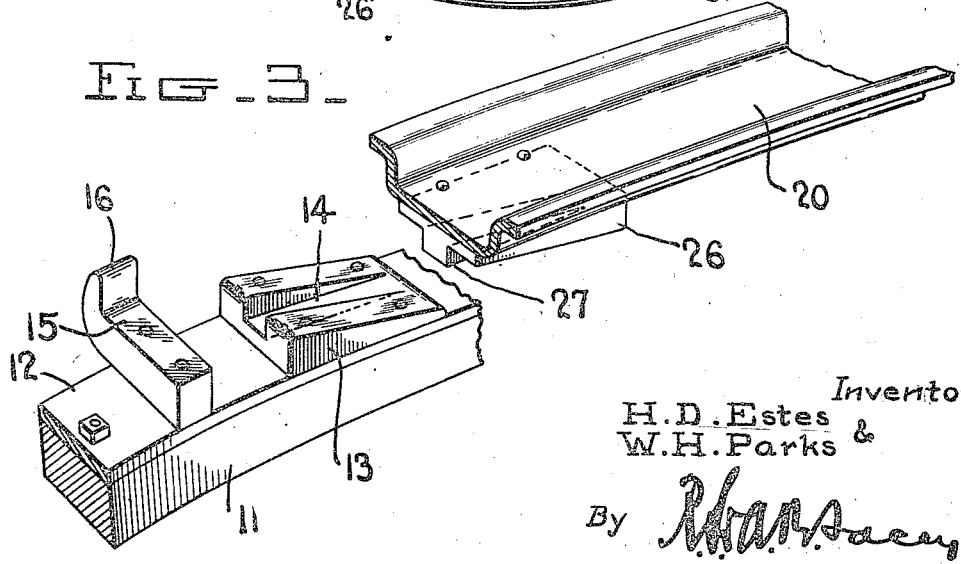
Inventors
H. D. Estes &
W. H. Parks
By *[signature]*,
Attorneys H. D. ESTES & W. H. PARKS.
DEMOUNTABLE WHEEL RIM.
APPLICATION FILED MAY 25, 1917.
1,274,863.
Patented Aug. 6, 1918.
3 SHEETS—SHEET 2.
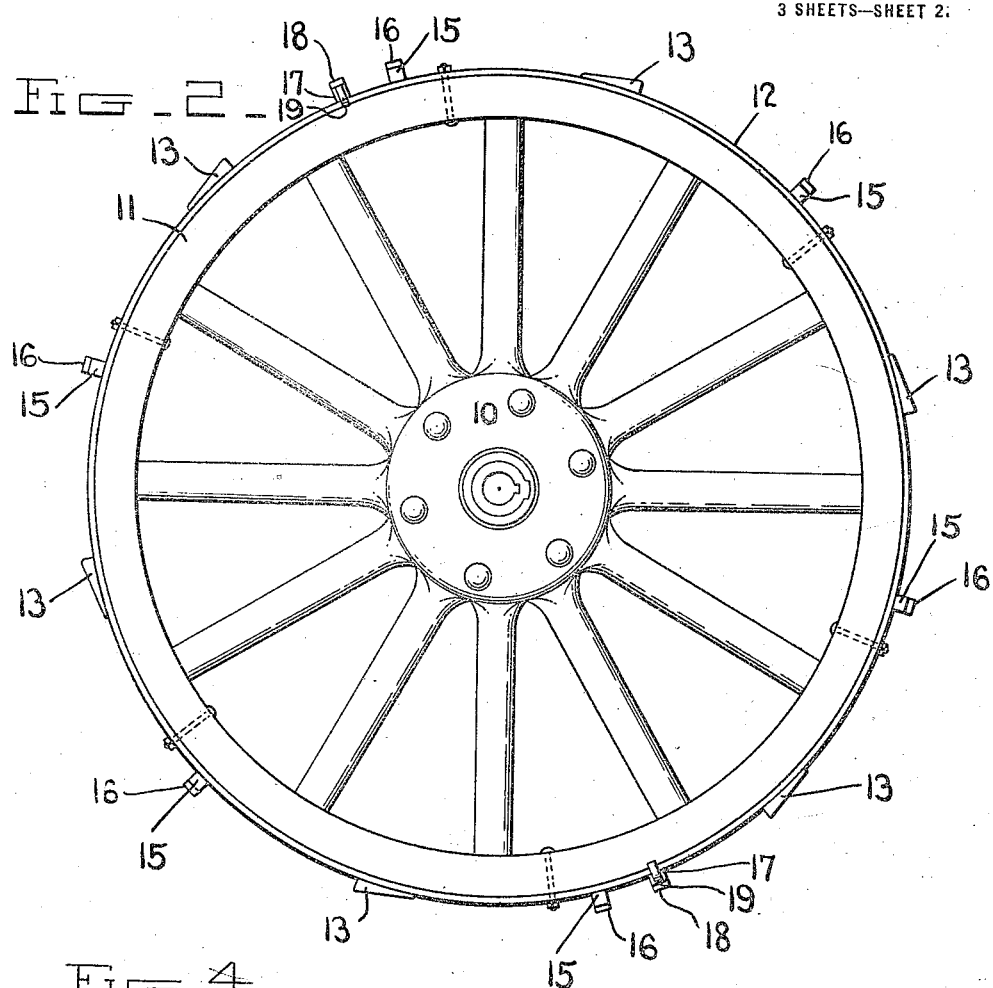
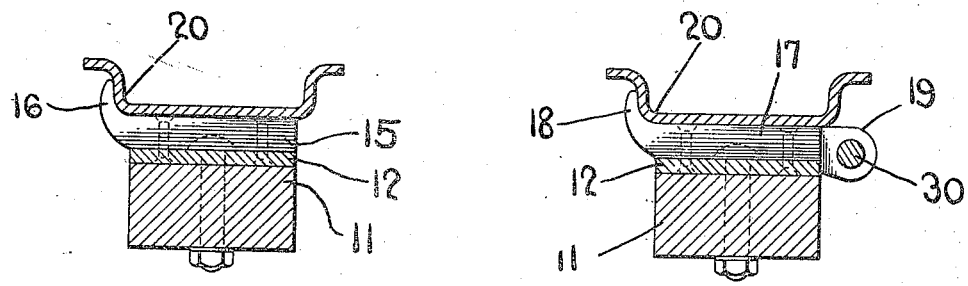
Inventors
H. D. Estes &
W. H. Parks
By
Attorneys

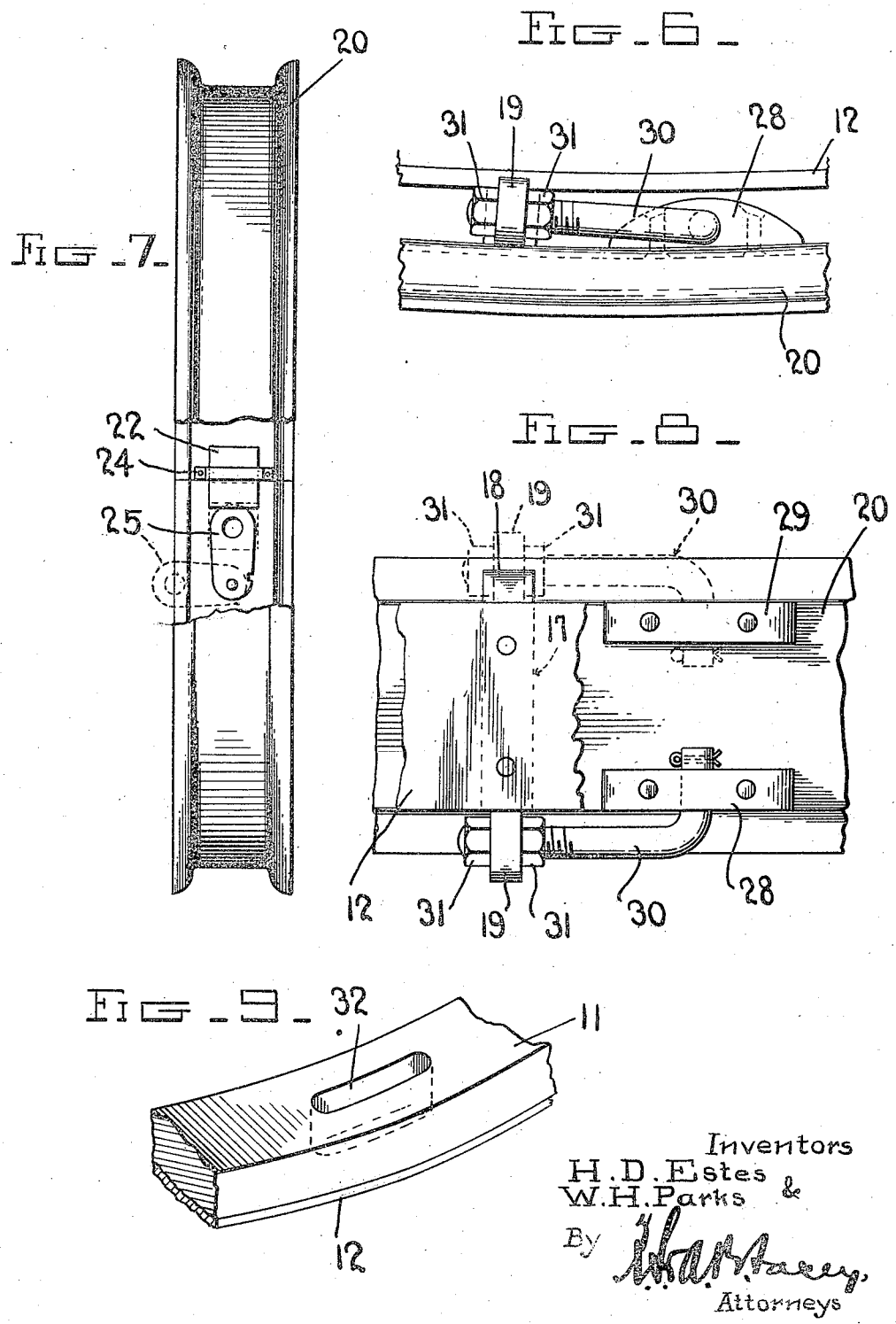

UNITED STATES PATENT OFFICE.

HENRY D. ESTES AND WALTER H. PARKS, OF HARTFORD, KENTUCKY.

DEMOUNTABLE WHEEL-RIM.

1,274,863.

Specification of Letters Patent.　　Patented Aug. 6, 1918.

Application filed May 25, 1917. Serial No. 171,020.

*To all whom it may concern:*

Be it known that we, HENRY D. ESTES and WALTER H. PARKS, citizens of the United States, residing at Hartford, in the county of Ohio and State of Kentucky, have invented certain new and useful Improvements in Demountable Wheel-Rims, of which the following is a specification.

This invention relates to an improved demountable wheel rim and has as its primary object to provide a construction more particularly adapted for use upon motor vehicles and wherein the rim may be expeditiously removed from the wheel with a minimum of labor and difficulty.

The invention has as a further object to provide a construction wherein the rim will be rigidly held upon the wheel and wherein rotation of the wheel under the influence of tractive power applied thereto will constantly tend to urge the rim into more secure engagement with the wheel.

And the invention has a still further object to provide a construction wherein the rim will be securely held against lateral movement with respect to the wheel without the use of the commonly employed side wedges.

Other and incidental objects will appear as the description proceeds and in the drawings wherein we have illustrated the preferred embodiment of the invention and wherein similar reference characters designate corresponding parts through the several views:

Figure 1 is a slide elevation of a vehicle wheel with our improved rim applied thereto, Fig. 2 is a similar view with the rim removed, Fig. 3 is a fragmentary perspective view more particularly showing the wedge blocks carried by the felly band of the wheel and the wedge blocks carried by the rim to coact with the blocks upon the felly, Fig. 4 is a transverse sectional view taken on the line 4—4 of Fig. 1 and looking in the direction of the arrows, this view showing the arrangement of the combined guide and stop cleats for the rim, Fig. 5 is a transverse sectional view taken on the line 5—5 of Fig. 1, this view particularly showing the arrangement of the combined guide and anchoring cleats employed for securing the rim upon the felly, Fig. 6 is a fragmentary side elevation showing one of the anchoring bolts employed for securing the rim upon the felly, Fig. 7 is a similar view illustrating the mounting of the anchoring bolts, this view also showing, in dotted lines, the manner in which the said bolts may be reversed when the rim is shifted from one wheel to another of a vehicle, Fig. 8 is a fragmentary elevation illustrating the manner in which the ends of the split rim are connected, and Fig. 9 is a fragmentary perspective view showing a portion of the felly and illustrating the slot formed therein for receiving the valve stem of the tire carried by the rim.

Referring more particularly to the drawings, we have illustrated a conventional type of wheel 10 having the usual felly 11 and in carrying out the present invention we equip this felly with a felly band 12 secured to the felly by a plurality of bolts or in any other approved manner. Secured upon the felly band 12 are a plurality of wedge blocks 13 arranged at circumferentially spaced points about the said band and formed with longitudinally extending slots 14. The blocks 13 all incline, of course, in the same direction circumferentially of the felly band. Mounted upon the felly band between the wedge blocks 13 are a plurality of transversely arranged combined guide and stop cleats 15. These cleats may be connected to the felly band by bolts or other suitable fastening devices or secured thereto in any other approved manner and at one side of the felly the said cleats are formed with upstanding stop lugs 16. The felly band 12 is further equipped at diametrically opposite points with transversely arranged anchoring cleats 17. These cleats may also be bolted or otherwise secured to the felly band and at the side of the felly adjacent the stop lugs 16 of the cleats 15, the inner extremities of the cleats 17 are formed with up-standing stop lugs 18. At their outer extremities, the cleats 17 are provided with laterally projecting apertured ears 19.

Formed to removably fit around the felly of the wheel is a split channeled rim 20 adapted to receive the conventional pneumatic tire. One end of this rim is equipped upon its inner side with a locking plate 22 overhanging the adjacent terminal of the rim to overlap the other terminal thereof and secured in position by a transverse clip 24. Pivotally mounted upon the terminal of the rim opposite the plate 22 is a locking pawl 25 adapted to engage beneath the overlapping portion of the plate 22 for rigidly securing the ends of the rim together. Upon its inner side the rim 20 is equipped with a plurality of circumferentially spaced wedge blocks 26 corresponding in number to the number of wedge blocks 13 upon the felly band 12. The wedge blocks 26 may be riveted or otherwise secured to the rim and incline circumferentially thereof in a direction opposite to the inclination of the wedge blocks 13. Extending longitudinally of the wedge blocks 26 are medially arranged locking ribs 27 projecting radially of the rim from the said blocks. These ribs 27 are adapted to be slidably received within the grooves 14 of the blocks 13.

Connected to the inner side of the rim 20 at diametrically opposite points are pairs of bearing blocks, and for convenience, corresponding blocks of the said pairs have been indicated at 28 and 29 respectively. The blocks of each pair are arranged adjacent opposite side edges of the rim and are apertured to removably receive the laterally turned shanks of anchoring bolts 30 detachably connected with the said blocks by cotter pins or in any other approved manner. The free extremities of the bolts 30 are adapted to be received through the ears 19 of the anchoring cleats 17 and are screw-threaded to receive the lock nuts 31.

In applying the rim, the said rim is fitted around the felly band 12 of the wheel and moved laterally thereon to engage the lugs 16 of the cleats 15. These lugs will thus form stops for the rim and when engaged by the said stops the rim is then rotated to ride the wedge blocks 26 of the rim upon the wedge blocks 13 of the felly band for tightly binding the rim upon the wheel. When the rim is thus rotated, the lugs 16 of the cleats 15 will act as guides for directing the rim circumferentially of the wheel and it will be seen that as the wedge blocks 26 of the rim are shifted upwardly upon the wedge blocks 16 of the felly band, the ribs 27 of the blocks 26 will be moved to engage within the grooves 14 of the blocks 13. The ribs 27 will thus coact with the blocks 13 for rigidly locking the rim against lateral movement with respect to the wheel. At the time the rim is initially fitted in position, the bolts 30 are inserted through the ears 19 of the anchoring cleats 17 so that by adjusting the nuts 31 of the said bolts, the rim may be further shifted circumferentially of the wheel for drawing the blocks 26 of the rim into binding engagement with the blocks 13 of the felly band with the bolts acting to hold the rim against circumferential displacement. Since in fitting the rim in position upon the wheel or removing the rim therefrom, the said rim must be rotated upon the wheel, the wheel felly 11 and band 12 are, as shown in detail in Fig. 8, formed with a circumferentially extending opening 32 to accommodate the valve stem of the tire carried by the rim, the valve stem being conventionally illustrated in dotted lines in Fig. 1.

The stop cleats 15 and 17 are of a thickness to engage the rim between the coacting wedge blocks 13 and 26 and will thus coact to support the rim upon the wheel. In any instance where it is desired to shift the rim from one wheel to another at opposite sides of a vehicle, the anchoring bolts 30 are disconnected from the pair of blocks 28 and are connected to the pair of blocks 29, as illustrated in dotted lines in Fig. 6 of the drawings, so that the said bolts will then be disposed to fit through the ears 19 of the anchoring cleats 17 at the outer side of the wheel. It will thus be seen that we provide a particularly simple and efficient construction for the purpose set forth and since the rim may be removed from the wheel by simply releasing the pair of anchoring bolts 30, the rim may be quickly demounted with a minimum of labor and difficulty. Furthermore, particular attention is directed to the fact that the wedge blocks upon the wheel are so arranged that when the wheel is turned in the direction of the arrow upon Fig. 1, under the influence of motive power applied thereto, the wedge blocks of the wheel will tend to move into more secure binding engagement with the wedge blocks of the rim to thus at all times maintain the rim firmly locked upon the wheel.

Having thus described the invention, what is claimed as new is:

1. A demountable wheel rim including a wedge block carried by the wheel, a stop cleat mounted upon the wheel and provided at one side of the wheel with an outwardly turned lug, a wedge block carried by the rim, the rim being shiftable laterally upon the wheel to engage the said lug and then being rotatable for shifting the said blocks into engagement with each other, said stop lug being arranged to act as a guide for the rim in its rotary movement, and locking means between the rim and wheel for holding the rim against retrograde movement upon the wheel.

2. A demountable wheel rim including a wedge block carried by the wheel, an anchoring cleat mounted upon the wheel, a wedge block carried by the rim the rim being shiftable circumferentially of the wheel to engage the said blocks, and an anchoring bolt carried by the rim and engaged with said cleat for holding the rim against retrograde movement upon the wheel.

3. A demountable wheel rim including a wedge block carried by the wheel, an anchoring cleat mounted upon the wheel and formed at one extremity with an apertured ear, a wedge block mounted upon the rim, the rim being shiftable circumferentially of the wheel to engage the said blocks, and an anchoring bolt swingingly connected to the rim and fitted through the aperture in the ear of said cleat for holding the rim against retrograde movement upon the wheel.

4. A demountable wheel rim including coacting means carried by the wheel and rim respectively and shiftable into engagement with each other upon the movement of the rim circumferentially of the wheel for binding the rim upon the wheel, and reversible means adapted for selective swinging engagement with opposite sides of the rim and engaged with the wheel for holding the rim against retrograde movement.

5. A demountable wheel rim including a wedge block carried by the wheel, an anchoring cleat permanently fixed upon the wheel, stop means carried by the said cleat, a wedge block mounted upon the rim, the rim being shiftable laterally on to the wheel to be limited by the said stop means of the anchoring cleat and being shiftable circumferentially of the wheel to ride the said blocks into engagement with each other and bind the rim upon the wheel, and anchoring means between the said cleat and rim for holding the rim against retrograde movement.

6. A demountable wheel rim including a wedge block arranged upon the wheel, a wedge block carried by the rim, the rim being shiftable circumferentially of the wheel to ride the said blocks into engagement with each other and bind the rim upon the wheel, and anchoring means adapted for selective swinging engagement at opposite sides of the rim and engaged with the wheel for holding the rim against retrograde movement.

7. A demountable wheel rim including a wedge block arranged upon the wheel, a wedge block carried by the rim, the rim being shiftable circumferentially of the wheel to ride the said blocks into engagement with each other and bind the rim upon the wheel, bearing blocks mounted upon the rim adjacent opposite sides thereof, and anchoring means adapted for selective swinging engagement with said bearing blocks and engaged with the wheel for holding the rim against retrograde movement.

In testimony whereof we affix our signatures.

HENRY D. ESTES, [L. S.]
WALTER H. PARKS. [L. S.]